(12) United States Patent
Sakurai et al.

(10) Patent No.: US 7,957,616 B2
(45) Date of Patent: Jun. 7, 2011

(54) METHOD OF PRODUCING AN OPTICAL CONNECTING COMPONENT, AND OPTICAL CONNECTING COMPONENT

(75) Inventors: Wataru Sakurai, Kanagawa (JP); Kazuhito Saito, Kanagawa (JP); Tomomi Sano, Aichi (JP)

(73) Assignees: Sumitomo Electric Industries, Ltd., Osaka (JP); Nihon Tsusin Denzai, Ltd., Aichi (JP)

( * ) Notice: Subject to any disclaimer, the term of this patent is extended or adjusted under 35 U.S.C. 154(b) by 204 days.

(21) Appl. No.: 11/989,793

(22) PCT Filed: Mar. 8, 2007

(86) PCT No.: PCT/JP2007/054585
§ 371 (c)(1),
(2), (4) Date: Jan. 31, 2008

(87) PCT Pub. No.: WO2007/105603
PCT Pub. Date: Sep. 20, 2007

(65) Prior Publication Data
US 2009/0110353 A1    Apr. 30, 2009

(30) Foreign Application Priority Data
Mar. 10, 2006   (JP) ............................. P.2006-066628

(51) Int. Cl.
*G02B 6/26* (2006.01)
*G02B 6/42* (2006.01)
*G02B 6/36* (2006.01)
(52) U.S. Cl. .......................................... 385/39; 385/88
(58) Field of Classification Search ............... 385/39–42, 385/88–94
See application file for complete search history.

(56) References Cited

U.S. PATENT DOCUMENTS

| | | | | |
|---|---|---|---|---|
| 7,301,139 B1 * | 11/2007 | Sakurai et al. | ............ | 250/227.11 |
| 7,364,369 B2 * | 4/2008 | Sakurai et al. | ................. | 385/89 |
| 7,618,200 B2 * | 11/2009 | Sakurai et al. | ................. | 385/89 |
| 7,712,975 B2 * | 5/2010 | Sakurai et al. | ................. | 385/88 |
| 7,771,130 B2 * | 8/2010 | Sakurai et al. | ................. | 385/88 |
| 2005/0123248 A1 * | 6/2005 | Sakurai et al. | ................. | 385/78 |
| 2007/0165986 A1 * | 7/2007 | Sakurai et al. | ................. | 385/88 |
| 2007/0212001 A1 * | 9/2007 | Sakurai et al. | ................. | 385/88 |
| 2008/0095505 A1 * | 4/2008 | Sakurai et al. | ................. | 385/88 |
| 2010/0220963 A1 * | 9/2010 | Tamura et al. | ................. | 385/88 |

FOREIGN PATENT DOCUMENTS

| | | |
|---|---|---|
| JP | 2004-279439 A | 10/2004 |
| JP | 2005-43622 A | 2/2005 |
| JP | 2005-189605 A | 7/2005 |
| JP | 2006-251212 A | 9/2006 |

* cited by examiner

*Primary Examiner* — Kevin S Wood
(74) *Attorney, Agent, or Firm* — McDermott Will & Emery LLP

(57) ABSTRACT

A method of producing an optical connecting component in which three-dimensional electric wiring can be easily and accurately performed, and the optical connecting component are provided.

A positioning projection 58 disposed on a second slide core 56 for positioning a core pin 54 disposed on a first slide core 55 is fitted in a positioning hole 34 disposed in a lead frame 30. The lead frame 30 is disposed in the vicinity of a lead pattern 31, so that the lead pattern 31 can be insert-molded while being positioned in an accurate position with respect to the second slide core 56. Therefore, it is possible to easily perform three-dimensional electric wiring in an accurate position.

6 Claims, 5 Drawing Sheets

(A)

(B)

METHOD OF PRODUCING AN OPTICAL CONNECTING COMPONENT, AND OPTICAL CONNECTING COMPONENT

RELATED APPLICATIONS

This application is the U.S. National Phase under 35 U.S.C. §371 of International Application No. PCT/JP2007/054585, filed on Mar. 8, 2007, which in turn claims the benefit of Japanese Application No. 2006-066628, filed on Mar. 10, 2006, the disclosures of which Applications are incorporated by reference herein.

TECHNICAL FIELD

The present invention relates to a method of producing an optical connecting component for connecting an optical fiber to a photoelectric conversion unit, and an optical connecting component produced by the production method, and particularly to a method of producing an optical connecting component for connecting a plurality of optical fibers passed through passage holes disposed in, for example, a molded member to a photoelectric conversion unit which is disposed on a front surface of the molded member so as to be opposed to the passage holes, and an optical connecting component produced by the production method.

BACKGROUND ART

As the broadband is developed, routers on network nodes and home information appliances are increasingly required to operate at higher speeds and to have larger capacities. For satisfying the requirements, the adoption of optical interconnection is extendedly examined. In the optical interconnection, E/O conversion is performed in an input/output portion of electric transmission, and transmission at high speed with large capacity is performed by effectively utilizing wide-band characteristics of optical fibers. For this purpose, a technique for, in an E/O conversion portion, coupling a photoelectric converting device (a light emitting device, a light receiving device) with an optical fiber is disclosed (for example, see Patent Reference 1).

As shown in FIG. 8, an optical connecting component 100 disclosed in Patent Reference 1 has a molded member 104 in which optical fibers 101 are mechanically held in holding holes 102 and optical input/output end faces 103 of the optical fibers 101 are exposed on the principal surface. On the principal surface of the molded member 104, electric wirings 105 are disposed. In front of the optical fibers 101, an optical semiconductor device 107 is disposed via an insulation film 106. The optical semiconductor device 107 is connected to the electric wirings 105 by means of bumps 108.

Patent Reference 1: Japanese Patent Unexamined Publication No. 2005-43622

DISCLOSURE OF THE INVENTION

Problems that the Invention is to Solve

In the method of producing an optical connecting component disclosed in Patent Reference 1, the provision of the electric wirings continuously formed on the principal surface and a side face of the molded member 104 enhances the degree freedom of connecting positions. In a practical sense, however, it is difficult to accurately form such three-dimensional electric wiring continuously over the surface of a material body.

It is an object of the invention to provide a method of producing an optical connecting component in which a three-dimensional electric wiring can be easily and accurately performed, and an optical connecting component produced by the production method.

Means for Solving the Problems

In order to attain the above-mentioned object, the method of producing an optical connecting component according to the invention is a method of producing an optical connecting component for connecting with a photoelectric conversion unit, the component having: a molded member having an passage hole through which an optical fiber is to be passed; and a lead pattern for electrically connecting with the photoelectric conversion unit, wherein the method comprises the steps of: disposing a positioning hole in a vicinity of the lead pattern of a lead frame having the lead pattern, and fitting the positioning hole on a positioning projection disposed on a die, thereby positioning the lead frame; and insert molding the lead frame in a state where the positioning hole is fitted on the positioning projection.

In the thus configured method of producing an optical connecting component, the positioning projection for performing the positioning is fitted in the positioning hole disposed in the lead frame. Since the lead frame is disposed in the vicinity of the lead pattern, insert molding can be performed while the lead pattern is positioned in an accurate position. Therefore, it is possible to easily perform three-dimensional electric wiring in an accurate position.

In the method of producing an optical connecting component according to the invention, preferably, the die comprises: a first slide core having a core pin for forming the passage hole; and a second slide core for positioning the core pin, and the positioning projection is disposed on the second slide core.

In the method of producing an optical connecting component according to the invention, preferably, the positioning projection has a rectangular section shape, and a height which is three or more times a thickness of the used lead frame.

In the thus configured method of producing an optical connecting component, the height of the positioning projection disposed on the second slide core is three or more times the thickness of the lead frame, so that the positioning projection can be surely fitted in the positioning hole disposed in the lead frame. Therefore, accurate positioning can be performed.

In the method of producing an optical connecting component according to the invention, preferably, when the lead frame is insert-molded in the molded member, the molding is performed while a tension is applied to the lead frame.

In the thus configured method of producing an optical connecting component, the tension is applied to the lead frame when the lead frame is insert-molded. Even when a resin is injected, therefore, the lead frame is held in the positioned location. Thus, it is possible to perform insert molding in an accurate position.

In the method of producing an optical connecting component according to the invention, preferably, the tension is applied to the lead frame in a hoop feeding direction. According to this configuration, the lead frame can be positioned more precisely with respect to the die.

The optical connecting component according to the invention is produced by the above-described method of producing an optical connecting component.

In the thus configured optical connecting component, the positioning projection which is disposed on the die for positioning the core pin disposed on the die is fitted in the positioning hole disposed in the lead frame. Therefore, the lead frame can be insert-molded while being positioned in an accurate position in the die, so that it is possible to easily perform three-dimensional electric wiring in an accurate position.

Effects of the Invention

According to the invention, a positioning projection is disposed in a die, and a positioning hole is disposed in the vicinity of a lead pattern in a lead frame. By fitting the positioning projection in the positioning hole, the lead frame can be insert-molded while being positioned in an accurate position in the die, so that it is possible to attain an effect that three-dimensional electric wiring can be easily performed in an accurate position.

DESCRIPTION OF REFERENCE NUMERALS AND SIGNS

10 . . . optical connecting component, 11 . . . optical fiber, 20 . . . molded member, 21 . . . front surface, 24 . . . passage hole, 30 . . . lead frame, 31 . . . lead pattern, 32 . . . positioning hole, 40 . . . photoelectric conversion unit, 54 . . . core pin, 55 . . . first slide core, 56 . . . second slide core, 58 . . . positioning projection, 58b . . . chamfer.

BEST MODE FOR CARRYING OUT THE INVENTION

Hereinafter, an embodiment of the invention will be described in detail with reference to the drawings.

Figure 1:
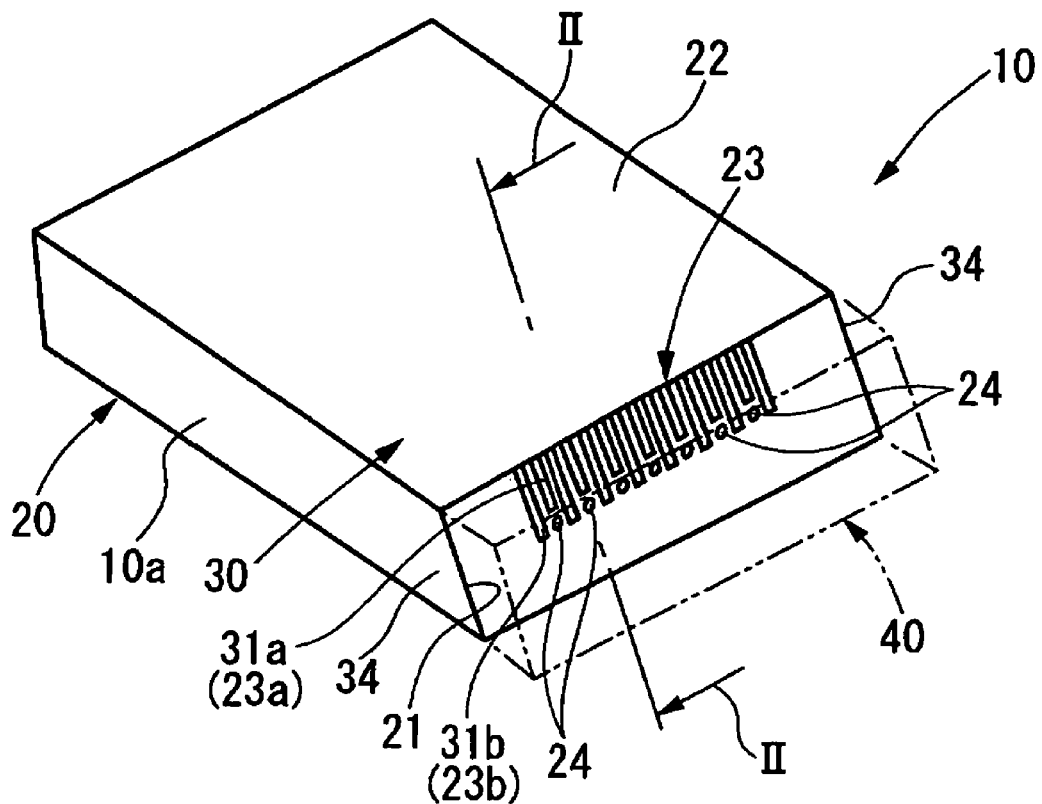
FIG. 1 is a perspective view showing a main-body side of an optical connecting component according to the invention.
Figure 2:
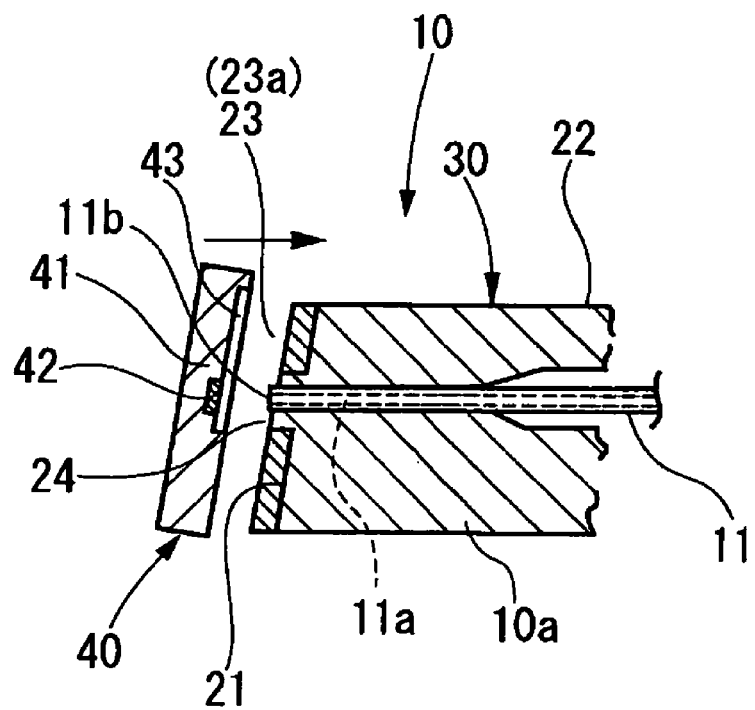
FIG. 2 is a section view at positions II-II in FIG. 1 in a tip end portion of the optical connecting component according to the invention.
Figure 3:
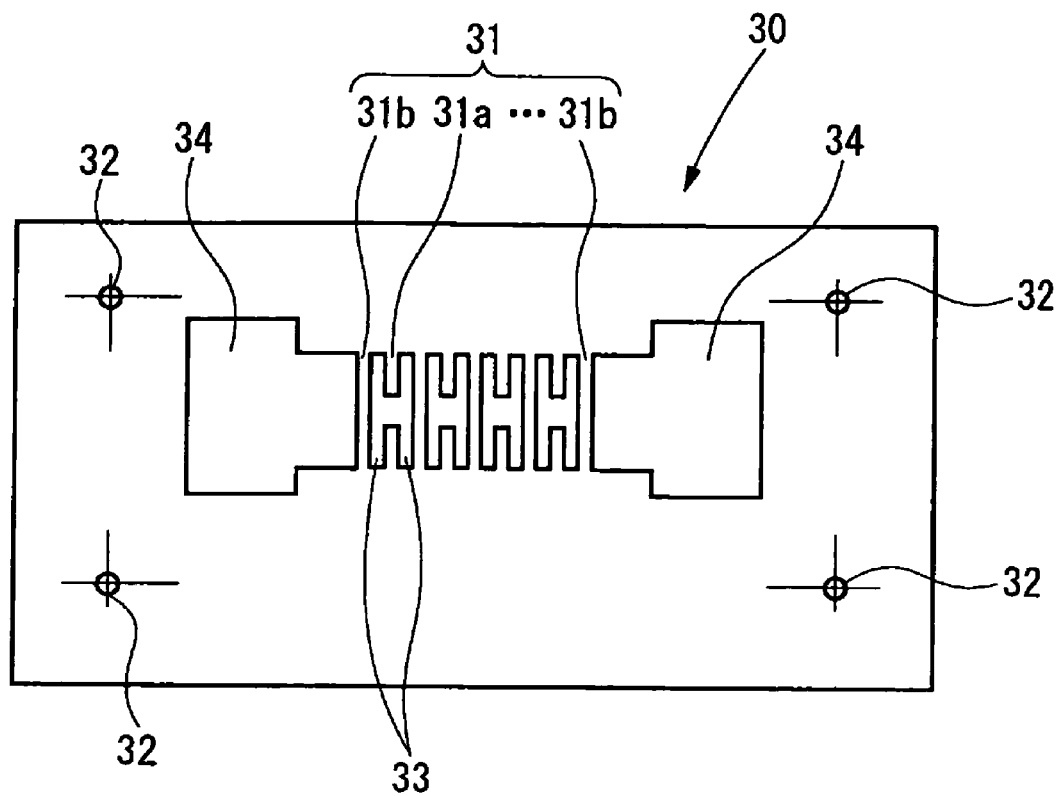
FIG. 3 is a plan view of a lead frame.
Figure 4:
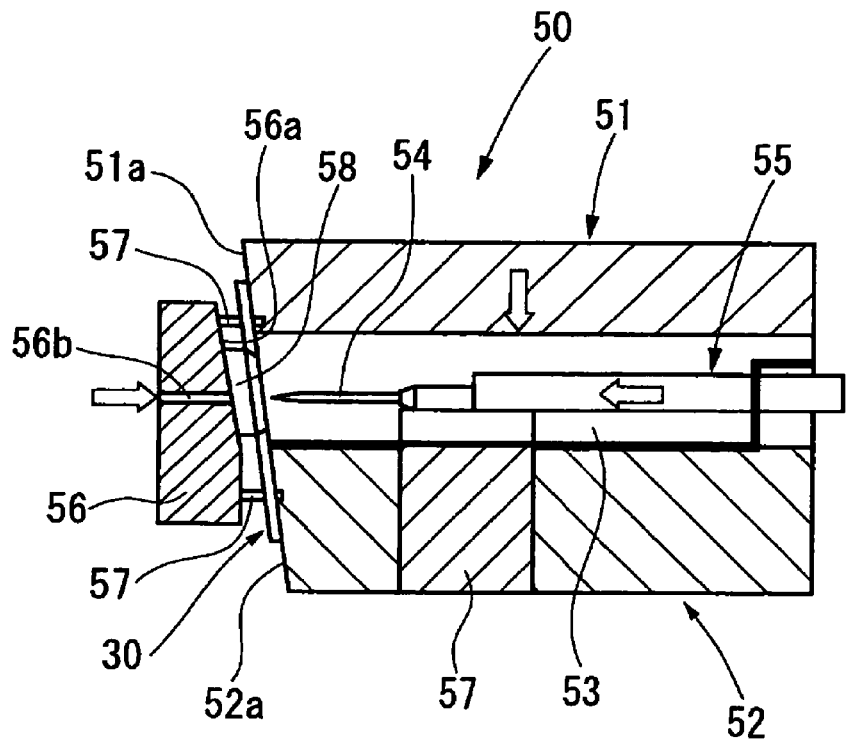
FIG. 4 is a section view showing a die used in the production of the optical connecting component according to the invention.
Figure 5:
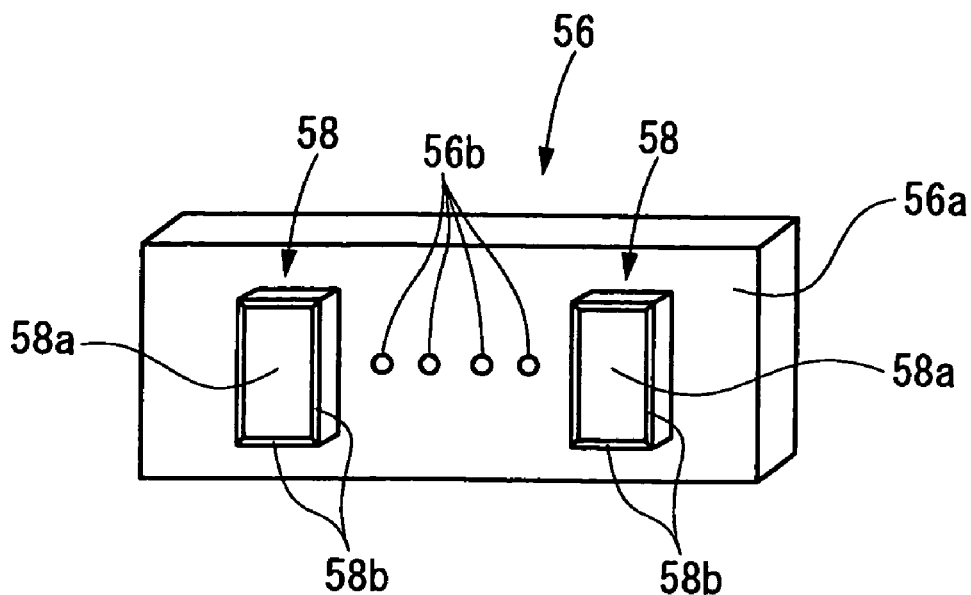
FIG. 5 is a perspective view of a second slide core.
Figure 6:
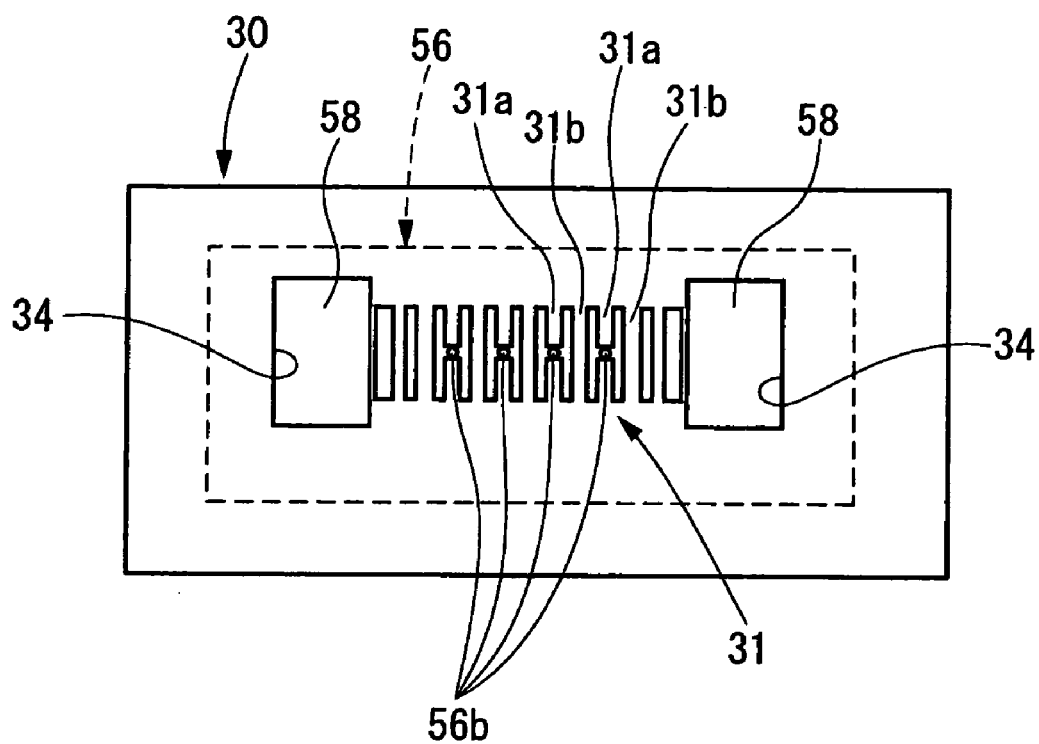
FIG. 6 is a front view showing a state where the lead frame is positioned with respect to the second slide core.
Figure 7:
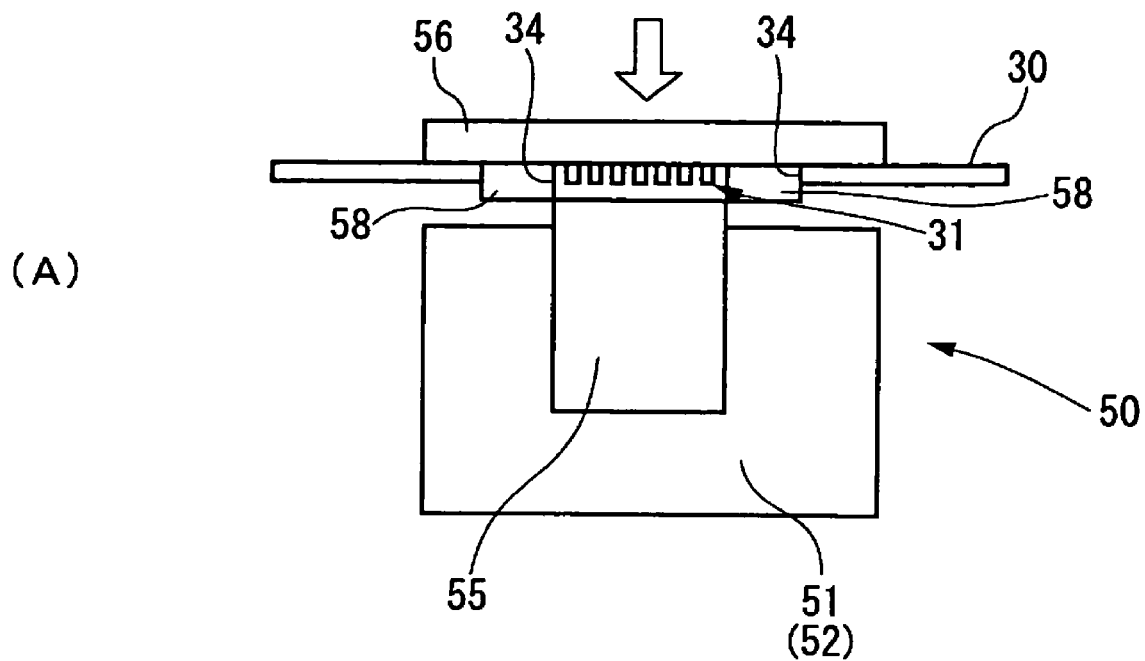
FIG. 7 (A) is a plan view showing a state where the second slide core to which the lead frame is attached is attached to the die, and (B) is a plan view showing a state where the second slide core is attached to the die.
Figure 7:
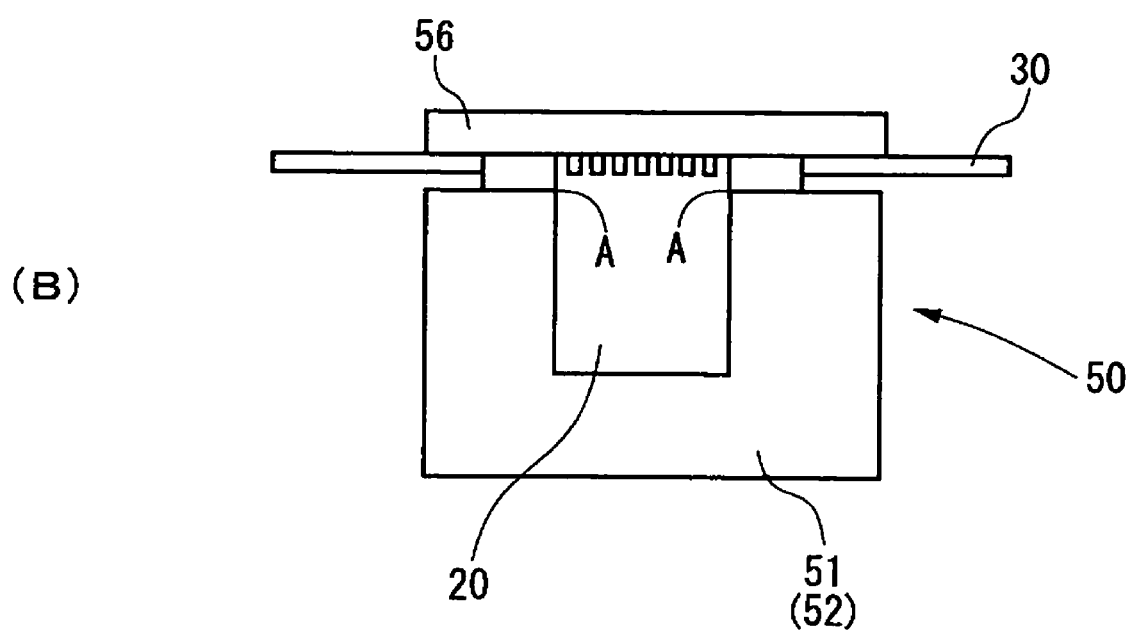
Figure 8:
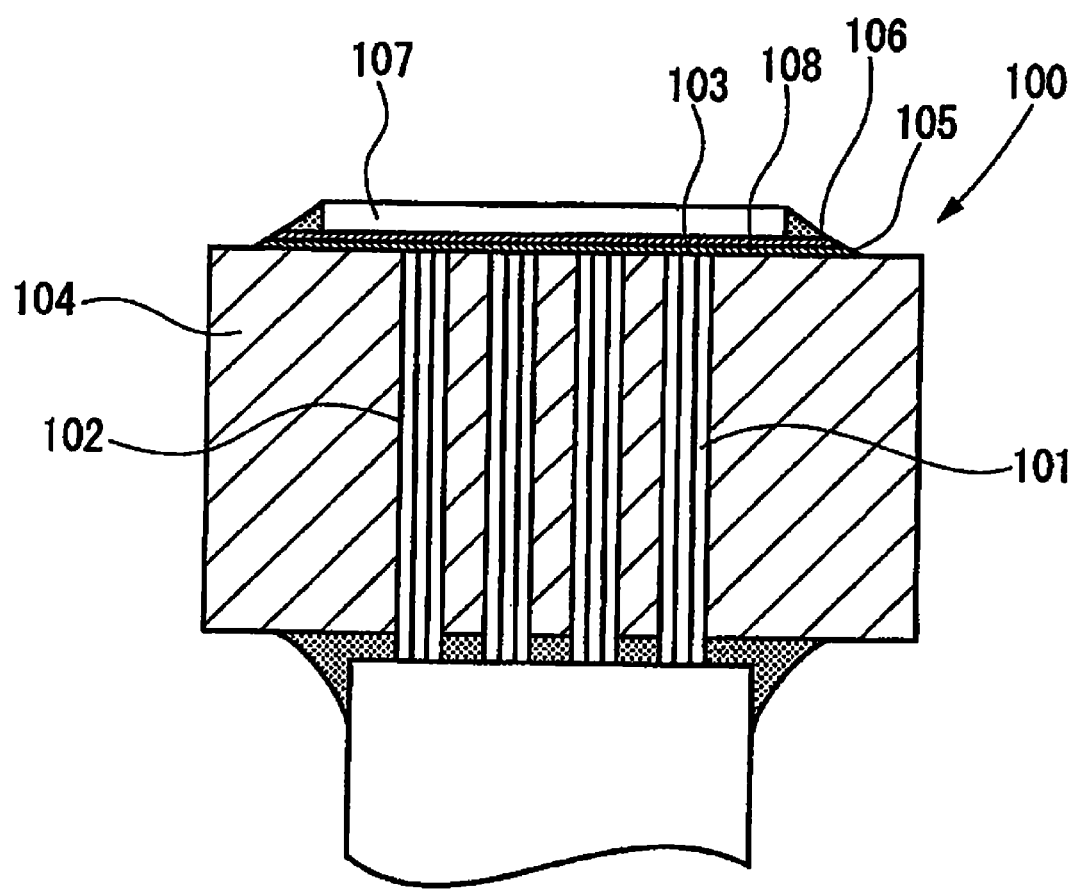
FIG. 8 is a section view showing a conventional optical connecting component.

FIG. 1 is a perspective view showing a main-body side of an optical connecting component according to the invention, FIG. 2 is a section view at positions II-II in FIG. 1 in a tip end portion of the optical connecting component according to the invention, FIG. 3 is a plan view of a lead frame, FIG. 4 is a section view showing a die used in the production of the optical connecting component according to the invention, FIG. 5 is a perspective view of a second slide core, FIG. 6 is a front view showing a state where the lead frame is positioned with respect to the second slide core, FIG. 7(A) is a plan view showing a state where the second slide core to which the lead frame is attached is attached to the die, and FIG. 7(B) is a plan view showing a state where the second slide core is attached to the die, and the lead frame is set.

As shown in FIGS. 1 and 2, an optical connecting component 10 has a main body 10a which is a molded member 20 having a substantially rectangular parallelepiped shape as a whole, and a photoelectric conversion unit 40 attached to a front surface 21 of the main body 10a. An electric wiring portion 23 is disposed over the front surface 21 of the main body 10a, and a side surface 22 (an upper face in FIGS. 1 and 2) continuous to the front surface 21. For example, in a position of a short electric wiring portion 23a in FIG. 1, optical fiber passage holes 24 from which end faces 11b of optical fibers 11 can be exposed are disposed. Between both end portions of the electric wiring portion 23 and the short electric wiring portions 23a, long wiring portions 23b are disposed.

In the photoelectric conversion unit 40, as shown in FIG. 2, a photoelectric converting device 41 is disposed. An active layer 42 is positioned opposedly to the optical fiber passage holes 24 of the front surface 21 of the main body 10a. The photoelectric conversion unit 40 is provided with a driving electrode 43 for supplying a power to the active layer 42 or for transmitting a signal from the active layer 42. When the photoelectric conversion unit 40 is attached to the front surface 21 of the main body 10a, the driving electrode 43 is disposed so as to be in contact with the electric wiring portion 23 of the main body 10a.

According to the configuration, when the optical connecting component 10 is mounted on a substrate (not shown), electric connection with the photoelectric converting device 41 is realized via the electric wiring portion 23. Therefore, an optical signal can be emitted to the optical fibers 11, or a signal can be transmitted in response to an optical signal from the optical fibers 11.

FIG. 3 shows a lead frame 30 used in the optical connecting component 10 according to the invention. The lead frame 30 has a lead pattern 31 for forming the above-mentioned electric wiring portion 23. The lead pattern 31 has short leads 31a forming the short electric wiring portion 23a, and long leads 31b forming the long electric wiring portion 23b. Spaces 33 are disposed by cutting away portions of the lead frame 30 between the leads 31a and 31b. Accordingly, in the molding, a resin 59 enters the spaces 33, so as to perform the insert molding.

In general, many lead frames 30 are disposed continuously in the vertical direction of FIG. 3 so that, when the lead frames 30 are to be insert-molded, the lead frames can be continuously supplied.

Positioning holes 32 for the lead frame 30 are disposed in four corners of the lead pattern 31. The positioning holes 32 are positioned remote from the lead pattern 31. For this reason, as the arrangement pitch of the optical fibers 11 is made smaller in accordance with increasing of the density, there arises a problem that the positioning accuracy is insufficient. In the case where the arrangement pitch of the optical fibers 11 is 250 µm, the width of the leads 31a and 31b is 50 µm, and the width of the spaces 33 is 75 µm, for example, a clearance between a core pin 54 and the leads 31b is only 37.5 µm. In order to accurately position the lead frame 30 in the vicinity of the lead pattern 31, therefore, positioning holes 34 are disposed in the lead frame 30. Fore example, the positioning holes 34 have a rectangular shape, and may be continuously disposed from the lead pattern 31.

The formation of the lead pattern 31, the positioning holes 32, the positioning holes 34, and the like in the lead frame 30 may be performed by, for example, etching or punching by means of press working.

Next, a die used in the method of producing the optical connecting component according to the invention will be described.

As shown in FIG. 4, the die 50 has an upper die 51 and a lower die 52. When the upper and lower dies 51, 52 are combined with each other, a cavity 53 for forming the main body 10a of the optical connecting component 10 is formed in the die. A second slide core 56 for forming the front surface 21 which is positioned oppositely to a first slide core 55, and from which the end portions 11a (see FIG. 2) of the optical fibers 11 are exposed, in the molded member 20 is positioned by positioning pins 57 in front of the upper and lower dies 51, 52 (in the left side in FIG. 4).

The first slide core 55 having a core pin 54 for forming the passage holes 24 (see FIGS. 1 and 2) for inserting the optical fibers 11 in the molded member 20 is inserted between the upper and lower dies 51, 52. In a middle portion of the lower die 52, a protrusion 57 for adjusting the height of the first slide core 55 is disposed in such a manner that the vertical position can be adjusted, and in a nested structure. In the injection of resin, the protrusion 57 adjusts the height of the first slide core 55 and supports the first slide core from below. In addition, in the fixing of the optical fibers 11 inside the produced optical connecting component 10, the protrusion forms an adhesive injection port (not shown) for injecting an adhesive agent.

As shown in FIG. 5, the second slide core 56 is provided with core-pin positioning holes 56b for positioning the core pin 54. The tip end of the core pin 54 is inserted into the core-pin positioning hole 56b, thereby allowing the core pin 54 in the cavity 53 to be accurately positioned.

On a front face 56a of the second slide core 56, positioning projections 58 for positioning the lead frame 30 are disposed forward projectingly. For example, the positioning projections 58 have a rectangular shape corresponding to the positioning holes 34. A chamfer 58b is provided in the periphery of each tip end face 58a. According to the configuration, the positioning projections can be easily fitted in the positioning holes of the lead frame. The height of the positioning projections 58 (the amount of forward projections) is three or more times the thickness of the lead frame 30. Therefore, the positioning projections can be surely fitted in the positioning holes 34 disposed in the lead frame 30, and accurate positioning can be realized.

In the second slide core 56, for example, the core-pin positioning holes 56b are finished by wire electric discharge machining, and thereafter the positioning projections 58 are formed by a grinding process in the vicinities of the core-pin positioning holes 56b with reference to the core-pin positioning holes. Therefore, the positional relationships between the core-pin positioning holes 56b and the positioning projections 58 can be made more precise.

FIG. 6 is a front view of a state where the lead frame 30 is positioned on the front face of the second slide core 56. The positioning projections 58 of the second slide core 56 are fitted in the positioning holes 34 disposed in the vicinity of the lead pattern 31 of the lead frame 30. End portions of the positioning projections 58 are exposed from the positioning holes 34 of the lead frame 30. Therefore, the lead frame 30 can be accurately positioned with respect to the second slide core 56.

Next, the method of producing the optical connecting component according to the invention will be described.

In the method of producing the optical connecting component 10, as shown in FIG. 1, the lead frame 30 (see FIG. 3) having the lead pattern 31 for electric connection to the electrode terminal portion of the photoelectric conversion unit 40 disposed oppositely to the optical fibers 11 is insert-molded on the front surface 21 of the molded member 20 through which the plurality of optical fibers 11 are inserted and from which the optical fibers 11 are exposed, and the side surface 22 continuous to the front surface 21. In the insert molding of the lead frame 30 in the molded member 20, the positioning projections 58 disposed on the front face 56a of the second slide core 56 are fitted in the positioning holes 34 disposed in the vicinity of the lead pattern 31 of the lead frame 30, thereby positioning the lead frame 30 (see FIG. 6).

Specifically, as shown in FIG. 4, the die 50 is set by combining both the dies 51, 52 with each other, and the cavity 53 for forming the molded member 20 is formed. As shown in FIGS. 6 and 7(A), the positioning projections 58 disposed in the second slide core 56 are fitted in the positioning holes 34 disposed in the lead frame 30, thereby positioning the lead frame 30 with respect to the second slide core 56 with high accuracy. As shown in FIGS. 4 and 7(B), the second slide 56 to which the lead frame 30 is positioned is positioned by the positioning pins 57 and attached to tip end faces 51a, 52a of the upper and lower dies 51, 52. Then, the protrusions 57 are adjusted so as to have a predetermined height, and the first slide core 55 is inserted. The tip end of the core pin 54 is inserted into the core-pin positioning hole 56b of the second slide core 56, thereby performing the positioning. Thereafter, a resin is injected into the cavity 53 inside the die 50, thereby insert molding the lead frame 30 to mold the molded member 20. At this time, the molding is desirably performed with applying a tension in the feeding direction (for example, the vertical direction in FIG. 4) to the lead frame 30. Even when the resin is injected, therefore, the lead frame 30 is held in the positioned location, whereby insert molding is enabled in the accurate position. In the positions corresponding to the points A in FIG. 7(B), the chamfers 58b of the positioning projections 58 exist, so that lines are formed in the produced molded member 20 in the thickness direction of the molded member 20. In order to reduce the clearances between the positioning holes of the lead frame and the corresponding positioning projections, a tension is applied in the traveling direction of the hoop feeding or the opposite direction, so that the positioning projections always butt against either edges of the projection holes. Therefore, the lead frame can be more precisely positioned with respect to the die.

When the insert molding of the lead frame 30 is completed by injecting the resin, the first slide core 55 and the second slide core 56 are moved in a direction of mutually separating, and then the molded member 20 is taken out of the die 50. Unnecessary portions of the lead frame 30 formed by insert molding in the front surface 21 of the molded member 20 are cut and removed.

Thereafter, as shown in FIG. 2, the photoelectric converting device unit 40 is attached to the front surface 21 of the molded member 20 so that the active layer 42 of the photoelectric converting device 41 is positioned in front of the optical-fiber passage holes 24 of the molded member 20, and the driving electrode 43 is in contact with the electric wiring portion 23 on the side of the main body 10a, i.e., the lead pattern 31 of the lead frame 30.

In the optical connecting component 10 produced in the above-described way, the front surface 21 of the main body 10a can be cut obliquely, thereby improving the transmission characteristics.

In the thus configured method of producing the optical connecting component, and the optical connecting component, the positioning projections 58 disposed on the second slide core 56 are fitted in the positioning holes 34 disposed in the vicinity of the lead pattern 31 of the lead frame 30. Therefore, the lead frame 30 can be insert-molded in the state where the lead frame 30 is located in the accurate position with respect to the second slide core 56. Therefore, it is possible to easily perform three-dimensional electric wiring in an accurate position.

The method of producing the optical connecting component and the optical connecting component of the invention are not limited to the above-described embodiment, and appropriate modulation, improvement, and the like can be performed.

In the above-described embodiment, for example, the positioning projections 58 and the positioning holes 34 are rectangular, but the shape is not limited to this. Other shapes can be applied.

In addition to the above-mentioned positioning projections 58 and positioning holes 34, for the positioning of the lead frame 30 with respect to the second slide core 56, the positioning holes 32 which are conventionally used can be used in combination. In this case, the positioning holes 32 function as guides until the positioning projections 58 are fitted in the positioning holes 34 with a small clearance.

INDUSTRIAL APPLICABILITY

As described above, in the method of producing an optical connecting component and the optical connecting component according to the invention, a positioning projection is disposed in a die, and a positioning hole is disposed in a lead frame. By fitting the positioning projection into the positioning hole, therefore, the lead frame can be insert-molded while the lead frame is located in an accurate position in the die. Consequently, an effect that three-dimensional electric wiring can be easily performed in an accurate position is attained. The invention is useful as the method of producing an optical connecting component for connecting optical fibers to a photoelectric conversion unit, and the optical connecting component, for example, as the method of producing an optical connecting component for connecting a plurality of optical fibers passed through passage holes disposed in a molded member to a photoelectric conversion unit disposed on a front surface of the molded member opposedly to the passage holes, the optical connecting component, and the like.

While the invention has been described in detail with reference to a specific embodiment, it will be obvious to those skilled in the art that various changes or modifications may be made without departing from the sprit and scope of the invention. The present application is based on Japanese Patent Application (No. 2006-066628) filed Mar. 10, 2006, and its disclosure is incorporated herein by reference.

The invention claimed is:

1. A method of producing an optical connecting component for connecting with a photoelectric conversion unit, said component having:
   a molded member having an passage hole through which an optical fiber is to be passed; and
   a lead frame having, on one surface thereof, a lead pattern for electrically connecting with said photoelectric conversion unit,
   said method comprising the steps of:
   disposing a positioning hole on a surface of the lead frame facing a die, the positioning hole being coaxial with said lead pattern of said lead frame, and fitting said positioning hole to a positioning projection disposed on a surface of the die facing the lead frame, thereby positioning said lead frame in the die; and
   molding said lead frame in the surface of the die facing the lead frame, in a state where said lead frame is positioned in the die, by forming a molded member having a passage hole, through which an optical fiber passes, inside the cavity of the die.

2. A method of producing an optical connecting component according to claim 1, wherein said die comprises: a first slide core having a core pin for forming said passage hole; and a second slide core for positioning said core pin, and said positioning projection is disposed on said second slide core.

3. A method of producing an optical connecting component according to claim 1, wherein said positioning projection has a rectangular section shape, and a height which is three or more times a thickness of said used lead frame.

4. A method of producing an optical connecting component according to claim 1, wherein, when said lead frame is insert-molded in said molded member, the molding is performed by injecting a resin into the cavity of the die while a tension is applied to said lead frame.

5. A method of producing an optical connecting component according to claim 4, wherein the tension is applied to said lead frame in a hoop feeding direction.

6. An optical connecting component which is produced by a method of producing an optical connecting component according to claim 1.

* * * * *